US009189931B2

(12) United States Patent
Kao

(10) Patent No.: US 9,189,931 B2
(45) Date of Patent: Nov. 17, 2015

(54) CIRCUITRY WITH WARNING FUNCTION

(71) Applicant: GIGA-BYTE TECHNOLOGY CO., LTD., New Taipei (TW)

(72) Inventor: Chin Jun Kao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 74 days.

(21) Appl. No.: 14/151,621

(22) Filed: Jan. 9, 2014

(65) Prior Publication Data
US 2015/0194028 A1    Jul. 9, 2015

(51) Int. Cl.
*G08B 21/00* (2006.01)
*G08B 5/36* (2006.01)
(52) U.S. Cl.
CPC ........................................ *G08B 5/36* (2013.01)
(58) Field of Classification Search
CPC ........................................................ G08B 5/36
USPC ........................................................ 340/635
See application file for complete search history.

(56) References Cited

U.S. PATENT DOCUMENTS

| 5,034,723 | A | * | 7/1991 | Maman | 340/568.2 |
| 6,919,813 | B2 | * | 7/2005 | Barr et al. | 340/687 |
| 7,321,312 | B1 | * | 1/2008 | Garnett | 340/653 |

* cited by examiner

*Primary Examiner* — Kerri McNally
(74) *Attorney, Agent, or Firm* — Chun-Ming Shih

(57) ABSTRACT

A circuitry with a warning function, adapted to an electronic device electrically connected to plural peripheral devices each of which has a connector, includes a mainboard, plural switches and a light-emitting device. The mainboard is electrically equipped with plural of sockets to be electrically plugged by the connectors respectively. The switches are located in the sockets respectively. The light-emitting device is electrically connected to the switches and a power supply for providing power thereto. When one of the connectors electrically plugs into the corresponding socket and turns on the corresponding switch, the corresponding light-emitting device reveals a first warning state, and when one of the connectors does not electrically plug into the corresponding socket and does not turn on the corresponding switch, the corresponding light-emitting device reveals a second warning state. Thus the error connection can be concluded and excluded immediately before the electronic device is turned on.

9 Claims, 8 Drawing Sheets

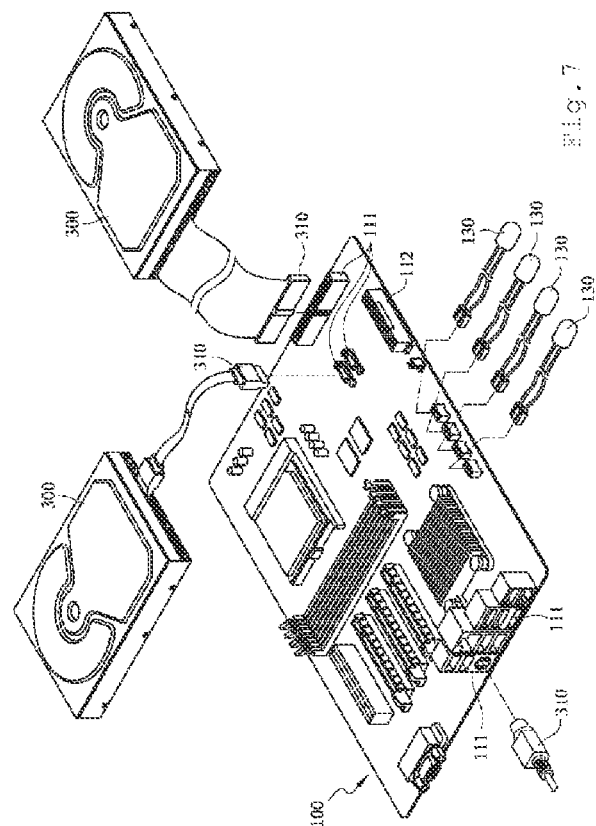

CIRCUITRY WITH WARNING FUNCTION

BACKGROUND

1. Technical Field

This disclosure relates to a circuitry, especially to a circuitry with a warning function by a light-emitting device.

2. Description of Related Art

As technology moves on, computer devices such as desktop computers, laptop computers or tablet computers are indispensable in our daily life or work. They are prevailing in every place and bring about various peripheral devices such as hard disks, keyboards, computer mice, and multi-media players.

For adapting to various peripheral devices, a computer device is equipped with various kinds of sockets such as ATX ports, SATA port and COM ports to be plugged by connectors for electrically connecting to peripheral devices configured for executing default functions.

Before a computer device is turned on and functions normally, the peripheral devices thereof must be connected thereto by electrically plugging the connectors firmly into the sockets on the mainboard thereof. Otherwise the peripheral devices cannot be detected by the computer device and the default functions cannot be executed. And even worse, the bad connection may cause damage on the mainboard.

Take a desktop computer as an example, most of the peripheral devices thereof are disposed inside the computer case and all the sockets are located either inside or at the rear side of the computer case. Therefore the condition is not easy to be clearly seen by naked eyes and the connecting state of the connectors plugging into the sockets cannot be acknowledged from the appearance. If a bad connection occurs it will not be checked out until the computer device is turned on and functions abnormally. Then the computer should be turned off and the connection state further checked, which is not convenient to a user.

Moreover, the connection state can only be checked by a use's naked eyes and it is possible that one of the connectors is not plugged firmly or omitted and the user has to re-open the computer case and check the connection state of every connectors. It is not only time-consuming but also risky on the possible damage of the mainboard or peripheral devices.

SUMMARY

In view of above problems, this disclosure provides a circuitry with a warning function by a light-emitting device.

In one embodiment, a circuitry with a warning function, adapted to an electronic device electrically connected to a plurality of peripheral devices each of which has a connector, includes a mainboard, a plurality of switches and a light-emitting device. The mainboard is electrically equipped with a plurality of sockets to be electrically plugged by the connectors respectively. The switches are electrically disposed at the mainboard and located in the sockets respectively. The light-emitting device is electrically connected to the switches and a power source for providing power to the light-emitting devices.

When all the connectors electrically plug into the sockets correspondingly and turn on the switches, the light emitting device reveals a first warning state, and when at least one of the connectors does not electrically plug into the corresponding socket and does not turn on the corresponding switch, the light emitting device reveals a second warning state.

In another embodiment, a circuitry with a warning function, adapted to an electronic device electrically connected to a plurality of peripheral devices each of which has a connector, includes a mainboard, a plurality of switches, and a plurality of light-emitting devices. The mainboard is electrically equipped with a plurality of sockets to be electrically plugged by the connectors respectively. The switches are electrically disposed at the mainboard and located in the sockets respectively. The light-emitting devices are electrically connected to the switches respectively and a power source for providing power to the light-emitting devices.

When one of the connectors plugs into the corresponding socket and turns on the corresponding switch, the corresponding light-emitting device reveals a first warning state, and when one of the connectors does not electrically plug into the corresponding socket and does not turn on the corresponding switch, the corresponding light-emitting device reveals a second warning state.

By observing the states of the light-emitting devices, the electrical connecting status of each of the connectors to the corresponding socket can be acknowledged immediately. Thus the error condition can be concluded and excluded immediately before the electronic device is turned on. And the mal-function or even the damage on the electronic device because of the wrong connection to the peripheral devices can be prevented. The disclosed circuitry of this disclosure can save testing time on repeatedly turning on the electronic device to check out which connector is not firmly connected to. Therefore the electronic device and the circuit thereof are also protected and the lifetime is prolonged.

These and other objectives of this disclosure will no doubt become obvious to those of ordinary skill in the art after reading the following detailed description of the preferred embodiments that is illustrated in the various figures and drawings.

BRIEF DESCRIPTION OF THE DRAWINGS

FIG. 7 is a perspective view of a circuitry of a third embodiment.

DETAILED DESCRIPTION OF THE EMBODIMENTS

Figure 1:
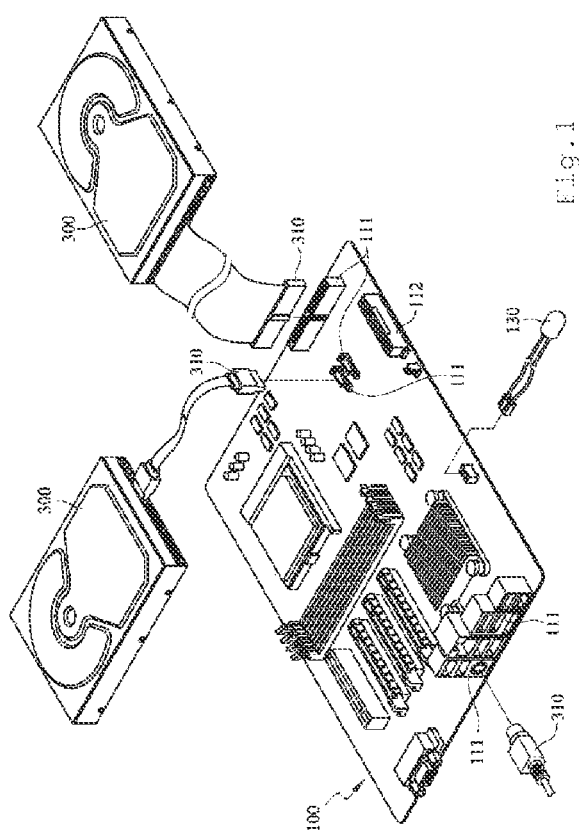
FIG. 1 is a perspective view of a circuitry of a first embodiment.
Figure 2:
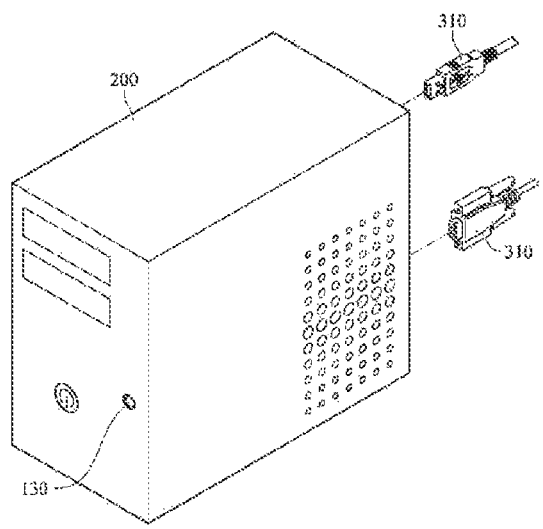
FIG. 2 is a schematic view of an electronic device equipped with the circuit of the first embodiment.
Figure 3:
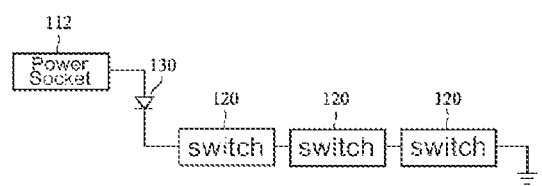
FIG. 3 is a circuit diagram of the circuitry of the first embodiment.

FIG. 1, FIG. 2, and FIG. 3 are a perspective view, a schematic view, and a circuit diagram of a circuitry of a first embodiment of this disclosure. The circuitry with a warning function adapted to an electronic device 200 electrically connected to a plurality of peripheral devices 300 configured for executing default functions. Each of the peripheral devices 300 has a connector 310 for electrically connecting to the electronic device 200.

The electronic device 200 can be but not limited to a desktop computer, a laptop computer, a tablet computer, or any electronic device that can be connected to peripheral devices 300. And the peripheral devices 300 described in the following embodiments can be but not limited to hard disks, compact-disk drivers, interface cards, multi-media players, computer mice, keyboards, trackballs, game consoles, joysticks, etc. Also a desktop computer is used as an exemplary interpretation of the electronic device 200 without any intention to limit the scope of the invention.

The circuitry of the first embodiment includes a mainboard 100, a plurality of switches 120 and a light-emitting device 130. The mainboard 100 is a motherboard of the electronic device 200 and equipped with a plurality of sockets 111 to be plugged by the connectors 310 respectively, so as to electrically connecting to the peripheral devices 300.

The mainboard 100 is further equipped with a power socket 112 electrically connected to a power supply (not shown) of the electronic device 200. The power supply is connected to an external power source to receive power of alternating current, such as mains electricity. The power supply transforms the power of alternating current into power of direct current and then provides the power of direct current to electronic components disposed at the mainboard 100 through the power socket 112. Moreover, one of the pins of the power socket 112 provides a 5-volt voltage for the operation of the mainboard 110 when the electronic device 200 is in a standby mode or a shut-down mode.

It is to be noted that for connecting to peripheral devices 300 configured for executing default functions, the sockets 111 can be of various kinds such as ATX ports, SATA ports, floppy ports, COM ports or USB ports to adapt to various kinds of the connectors 310 electrically plugging thereto.

The switches 120 are electrically disposed at the mainboard 100 and located in the socket 111 respectively. Each of the switches 120 is electrically connected to the power socket 112 and receives a 5-V voltage therefrom. The light-emitting device 130 is disposed at and exposed from a case of the electronic device 200, and electrically connected to the switches 120. The light-emitting device 130 also electrically connected to the power socket 112, so as to electrically connected to the power supply for providing a 5-V voltage power to the light-emitting device 130. The light-emitting device 130 can be but not limited to a light-emitting diode or a bulb.

The switches 120 are electrically connected in series, and the light-emitting device 130 and the power socket 112 are electrically connected to the switches 120 in series. When the connectors 310 of the peripheral devices 300 electrically plug into the sockets 111 correspondingly, the connectors 310 turn on each of the switches 120 and forming a current loop for proving power to the light-emitting device 130 from the power socket 112. The light-emitting device 130 then reveals a first warning state by emitting light, such as emitting constant green light. By observing the first warning state revealed by the light-emitting device 130, it can be acknowledged that all the connectors 310 are firmly plugged into the sockets 111 and the electronic device 200 can be turned on without error.

Furthermore, when one of the connectors 310 is omitted or the connector 310 does not firmly plug into a corresponding socket 111, for example if a SATA connector of a hard disk does not firmly plug into a SATA port and does not turn on the corresponding switch 120 in the SATA port, the current loop is not formed and power cannot be provided to the light-emitting device 130 by the power socket 112. The light-emitting device 130 then reveals a second warning state in which the light is not emitted. By observing the second warning state revealed by the light-emitting device 130, it can be acknowledged that at least one of the connectors 310 does not firmly plug into the corresponding sockets 111 and a system diagnosis should be done before turning on the electronic device 200.

When the condition that at least one of the connectors 310 does not firmly plug into the corresponding sockets 111 is excluded, the light-emitting device 130 reveals the first waning state by emitting light to inform that the electronic device 200 can be turned on now. It is to be noted that the first warning state is not limited to be revealed by emitting constant green light. One skilled in the art can design the first warning state to be any form such as blinking green light, blinking red light, or constant red light according to application requirements.

Figure 5A:
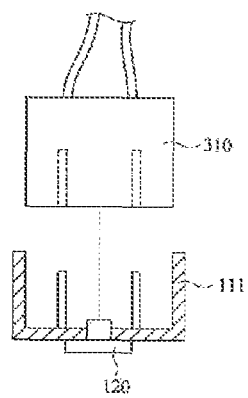
FIG. 5a is a cross-sectional view of a socket with a mechanical switch and a connector.
Figure 5B:
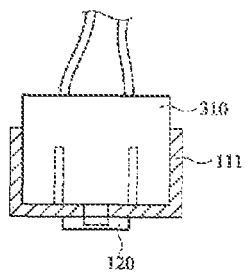
FIG. 5b is a cross-sectional view of a socket with a mechanical switch and a connector.

In more detail, in this embodiment the switches 120 are mechanical switches as shown in FIG. 5a and FIG. 5b and disposed at inner front walls of the sockets 111 respectively, to be pressed and turned on by the connectors electrically plugging into the sockets respectively. When the connectors 310 do not plug into corresponding sockets 111, the switches 120 are not pressed and turned on. The current loop is not formed and the light-emitting device 130 reveals the second warning state. When the connectors 310 plug into the sockets 111, press and turn on all the switches 120, the current loop is formed and the light-emitting device 130 reveals the first warning state.

Figure 6A:
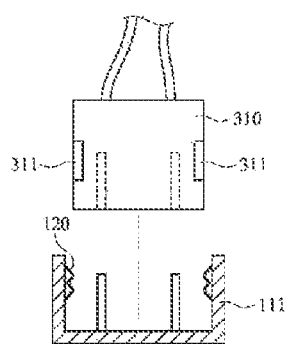
FIG. 6a is a cross-sectional view of a socket with a conductive reed and a connector.
Figure 6B:
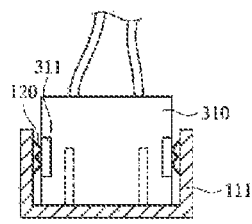
FIG. 6b is a cross-sectional view of a socket with a conductive reed and a connector.

On the other side, the switches 120 can be conductive reeds as it is shown in FIG. 6a and FIG. 6b and disposed at side walls of the sockets 111 respectively. Each of the connectors 310 has a conducting component 311 on an outer surface of each connector 310. The conducting component 311 is made of metal or other electrically conductive material. When the connectors 310 do not plug into corresponding sockets 111, the switches 120 are not contacted and turned on, the current loop is not formed and the light-emitting device 130 reveals the second warning state. When the connectors 310 plug into the sockets 111, the conducting components 311 electrically contact with and turn on all the switches 120, the current loop is formed and the light-emitting device 130 reveals the first warning state.

Figure 4:
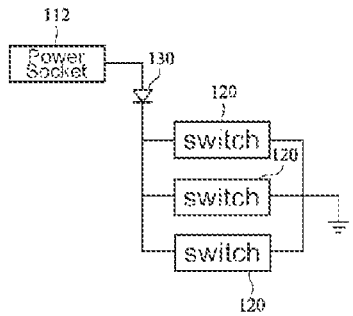
FIG. 4 is a circuit diagram of a circuitry of a second embodiment.

FIG. 4 is a circuit diagram of a circuitry of the second embodiment of this disclosure. The circuitry in this embodiment is similar to that in the first embodiment and only the difference will be described in the following paragraphs.

In this embodiment, the switches 120 are electrically connected in parallel. Each of the switches 120 is also connected to the light-emitting device 130 and the power socket 112 respectively. When the connectors 310 of the peripheral devices 300 electrically plug into the sockets 111 respectively, the connectors 310 turn on each of the switches 120 and open all the current loops for proving power to the light-emitting device 130 from the power socket 112. The light-emitting device 130 then reveals a first warning state in which light is not emitted. By observing the first warning state revealed by the light-emitting device 130, it can be acknowledged that all the connectors 310 firmly plug into the sockets 111 and the electronic device 200 can be turned on without error.

Furthermore, if one of the connectors 310 is omitted or does not firmly plug into a corresponding socket, for example if a SATA connector of a hard disk does not firmly plug into a SATA port, the switch in the SATA port is not turned on. The current loop is formed and power is provided to the light-emitting device 130 by the power socket 112. The light-emitting device 130 then reveals a second warning state by emitting light, such as a constant red light. By observing the second warning state revealed by the light-emitting device 130, it can be acknowledged that at least one of the connectors 310 is not firmly plugged into the corresponding sockets and an examination should be done before turning on the electronic device 200.

When the condition that at least one of the connectors 310 does not firmly plug into the corresponding sockets is excluded, the light-emitting device 130 reveals the first waning state in which the light is not emitted to inform that the electronic device 200 can be turned on now. It is to be noted that the second warning state is not limited to be revealed by emitting constant red light. One skilled in the art can design the first warning state to be any form such as blinking green light, blinking red light, or constant green light according to application requirements.

In more detail, the switches 120 can be mechanical switches or conductive reeds as disclosed in the first embodiment. Also the related operation of the switches 120 and the connectors 310 is the same as that disclosed in the first embodiment and will not be described further.

Figure 8:
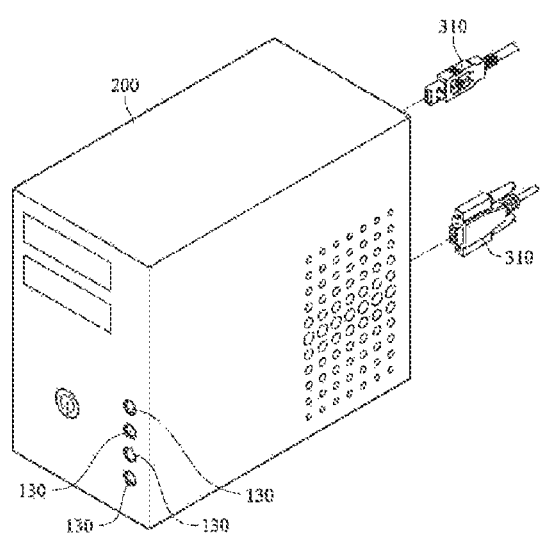
FIG. 8 is a schematic view of an electronic device equipped with the circuit of the third embodiment.
Figure 9:
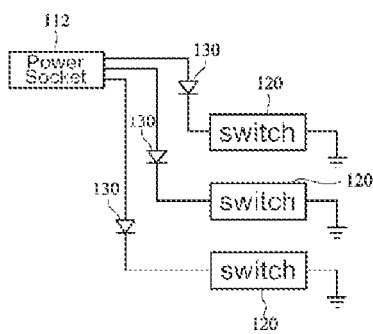
FIG. 9 is a circuit diagram of the circuitry of the third embodiment of this disclosure.

FIG. 7, FIG. 8, and FIG. 9 are a perspective view, a schematic view, and a circuit diagram of a circuitry of a third embodiment of this disclosure. The circuitry in this embodiment is similar to that in the first embodiment and only the difference will be described in the following paragraphs.

The circuitry of the third embodiment includes a mainboard 100, a plurality of switches 120 and a plurality of light-emitting devices 130. The mainboard 100 is equipped with a power socket 112 and a plurality of sockets 111 for electrically connecting to the peripheral devices 300 by electrically plugging the connectors 300 thereto.

The switches 120 are electrically disposed at the mainboard 100 and located in the socket 111 respectively. Each of the switches 120 is electrically connected to the power socket 112 and receives a direct-current voltage therefrom. Each of the light-emitting devices 130 is disposed at and exposed from a case of the electronic device 200, and electrically connected to the corresponding switch and the power socket 112 for providing a 5-V voltage to the light-emitting devices 130. The light-emitting device 130 can be but not limited to a light-emitting diode or a bulb.

The power socket 112, each of the light-emitting devices 130 and the corresponding switches 120 are electrically connected in series. When one of the connectors 310 of the peripheral devices 300 electrically plug into the corresponding socket 111, the connector 310 turns on the corresponding switch 120 and forming a current loop for proving power to the corresponding light-emitting device 130 from the power socket 112. The corresponding light-emitting device 130 then reveals a first warning state by emitting light, such as a constant green light. By observing the first warning state revealed by the light-emitting device 130, it can be acknowledged that the connector 310 firmly plugs into the sockets 111 and the electronic device 200 can be turned on without error.

Furthermore, if one of the connectors 310 is omitted or does not firmly plug into a corresponding socket 111, the switch 120 in the corresponding socket 111 is not turned on. The corresponding current loop is not formed and power cannot be provided to the corresponding light-emitting device 130 by the power socket 112. The corresponding light-emitting device 130 then reveals a second warning state in which the light is not emitted. By observing the second warning state revealed by the light-emitting device 130, it can be acknowledged that the corresponding connectors 310 is not firmly plugged into the corresponding sockets 111 and an examination should be done before turning on the electronic device 200.

When the condition that the corresponding connectors 310 does not plug into the corresponding sockets 111 is excluded, the light-emitting device 130 reveals the first waning state by emitting light to inform that the electronic device 200 can be turned on now. It is to be noted that the first warning state is not limited to be revealed by emitting constant green light. One skilled in the art can design the first warning state to be any form such as a blinking green light, a blinking red light, or a constant red light according to application requirements.

Furthermore, the first warning state can also be revealed by not emitting light and the second warning state can also be revealed by emitting light by changing the design of open or short a loop by the switches. It is well-known to one skilled in the art and will not be described further.

The advantage of this embodiment is that each socket 310 corresponds to a dedicated current loop formed by the dedicated switch 120, the dedicated light-emitting device 130, and the power socket 112 and it is convenient to acknowledge which connector 310 does not plug into the socket 111 by observing the state of the dedicated light-emitting device 130. Thus a user can exclude the error directly on the dedicated socket 310 rather than checking the conditions of all the sockets 310 which is the case in the first and second embodiments and the time is saved.

In more detail, the switches 120 can be mechanical switches or conductive reeds as disclosed in the first embodiment. Also the related operation of the switches 120 and the connectors 310 is the same as that disclosed in the first embodiment and will not be described further.

This disclosure is advantageous because by observing the states of the light-emitting devices, the electrical connecting status of each of the connectors to the corresponding socket can be acknowledged rapidly and accurately. Thus the error condition can be concluded and excluded immediately before the electronic device is turned on. And the mal-function or even the damage on the electronic device because of the wrong connection to the peripheral devices can be prevented.

The disclosed circuitry of this disclosure can save testing time on repeatedly turning on the electronic device to check out which connector is not firmly connected to. Therefore the electronic device and the circuit thereof are also protected and the lifetime is prolonged.

The aforementioned descriptions represent merely the preferred embodiment of this disclosure, without any intention to limit the scope of this disclosure thereto. Various equivalent changes, alterations, or modifications based on the claims of this disclosure are all consequently viewed as being embraced by the scope of this disclosure.

What is claimed is:

1. A circuitry with a warning function, adapted to an electronic device electrically connected to a plurality of peripheral devices each of which has a connector, comprising:
   a mainboard, electrically equipped with a plurality of sockets to be electrically plugged by the connectors respectively;
   a plurality of switches, electrically disposed at the mainboard and located in the sockets respectively; and
   a light-emitting device, electrically connected to the switches and a power supply for providing power to the light-emitting device;
   wherein when all the connectors electrically plug into the sockets correspondingly and turn on the switches, the light emitting device reveals a first warning state, and when at least one of the connectors does not electrically plug into the corresponding socket and does not turn on the corresponding switch, the light emitting device reveals a second warning state.

2. The circuitry with the warning function of claim 1, wherein the mainboard is further equipped with a power socket electrically connected to the switches, and the light-emitting device; and the power socket receives power of alternating current from the power supply, and the power socket provides power of direct current to the switches and the light-emitting device.

3. The circuitry with the warning function of claim 1, wherein the switches are connected in series, and the light-emitting device emits light in the first warning state and does not emit the light in the second warning state.

4. The circuitry with the warning function of claim 1, wherein the switches are connected in parallel, and the light-emitting device does not emit light in the first warning state and emits the light in the second warning state.

5. The circuitry with the warning function of claim 1, wherein the switches are mechanical switches disposed at inner front walls of the sockets respectively, to be pressed and turned on by the connectors electrically plugging into the sockets respectively.

6. The circuitry with the warning function of claim 1, wherein the switches are conductive reeds disposed at inner side walls of the sockets respectively, each of the connectors has a conducting component on an outer surface of each connector, and the conducting components electrically contact with and turn on the switches when the connectors electrically plug into the sockets respectively.

7. A circuitry with a warning function, adapted to an electronic device electrically connected to a plurality of peripheral devices each of which has a connector, comprising:
a mainboard, electrically equipped with a plurality of sockets to be electrically plugged by the connectors respectively;
a plurality of switches, electrically disposed at the mainboard and located in the sockets respectively; and
a plurality of light-emitting devices, electrically connected to the switches respectively and a power supply for providing power to the light-emitting devices;
wherein when one of the connectors electrically plugs into the corresponding socket and turns on the corresponding switch, the corresponding light-emitting device reveals a first warning state, and when one of the connectors does not electrically plug into the corresponding socket and does not turn on the corresponding switch, the corresponding light-emitting device reveals a second warning state, wherein the mainboard is further equipped with a power socket electrically connected to the switches, and the light-emitting devices; and the power socket receives power of alternating current from, and the power socket provides power of direct current to the switches and the light-emitting devices.

8. The circuitry with the warning function of claim 7, wherein the switches are conductive reeds disposed at inner side walls of the sockets respectively, each of the connectors has a conducting component on an outer surface of each connectors, and the conducting components electrically contact with and turn on the switches when the connectors electrically plug into the sockets respectively.

9. A circuitry with a warning function, adapted to an electronic device electrically connected to a plurality of peripheral devices each of which has a connector, comprising:
a mainboard, electrically equipped with a plurality of sockets to be electrically plugged by the connectors respectively;
a plurality of switches, electrically disposed at the mainboard and located in the sockets respectively; and
a plurality of light-emitting devices, electrically connected to the switches respectively and a power supply for providing power to the light-emitting devices;
wherein when one of the connectors electrically plugs into the corresponding socket and turns on the corresponding switch, the corresponding light-emitting device reveals a first warning state, and when one of the connectors does not electrically plug into the corresponding socket and does not turn on the corresponding switch, the corresponding light-emitting device reveals a second warning state, wherein the switches are mechanical switches disposed at inner front walls of the sockets respectively, to be pressed and turned on by the connectors electrically plugged into the sockets respectively.

* * * * *